United States Patent
Takahara et al.

(10) Patent No.: US 8,742,044 B2
(45) Date of Patent: Jun. 3, 2014

(54) METHOD FOR PRODUCING POLYMER NANOCOMPOSITE, AND FLAME-RETARDANT POLYMER NANOCOMPOSITE FORMED BY THE PRODUCTION METHOD

(75) Inventors: Atsushi Takahara, Fukuoka (JP); Hideyuki Otsuka, Fukuoka (JP); Motoyasu Kobayashi, Fukuoka (JP); Hideaki Yukutake, Saitama (JP); Tetsuo Kamimoto, Saitama (JP)

(73) Assignees: Kyushu University, National University Corporation, Fukuoka (JP); Adeka Corporation, Tokyo (JP)

( * ) Notice: Subject to any disclaimer, the term of this patent is extended or adjusted under 35 U.S.C. 154(b) by 409 days.

(21) Appl. No.: 13/128,773

(22) PCT Filed: Nov. 18, 2009

(86) PCT No.: PCT/JP2009/069566
§ 371 (c)(1),
(2), (4) Date: May 11, 2011

(87) PCT Pub. No.: WO2010/064539
PCT Pub. Date: Jun. 10, 2010

(65) Prior Publication Data
US 2011/0213111 A1    Sep. 1, 2011

(30) Foreign Application Priority Data
Dec. 5, 2008   (JP) .................. 2008-310995

(51) Int. Cl.
*C08F 4/04* (2006.01)
*C08F 12/08* (2006.01)

(52) U.S. Cl.
USPC ........... 526/194; 524/445; 524/442; 524/492; 524/493; 524/500; 524/502; 524/261

(58) Field of Classification Search
USPC ......... 526/194; 524/445, 442, 492, 493, 500, 524/502, 261
See application file for complete search history.

(56) References Cited

U.S. PATENT DOCUMENTS

| | | | | |
|---|---|---|---|---|
| 6,252,020 B1 * | 6/2001 | Kuo et al. | ...... | 526/128 |
| 6,994,964 B1 | 2/2006 | Chang et al. | | |
| 7,973,102 B2 * | 7/2011 | Takahashi et al. | ........ | 524/262 |
| 2010/0036037 A1 | 2/2010 | Osman et al. | | |

FOREIGN PATENT DOCUMENTS

| | | |
|---|---|---|
| EP | 1081163 | 3/2001 |
| JP | 2000-109625 | 4/2000 |
| JP | 2000-129078 | 5/2000 |
| JP | 2004-002538 | 1/2004 |
| JP | 2004-051817 | 2/2004 |
| WO | WO 2007/109877 | 10/2007 |

OTHER PUBLICATIONS

Extended European Search Report dated Aug. 3, 2012; Application No. 09830306.8.
International Search Report, PCT/JP2009/069566, Dec. 22, 2009.
Jianbo Di et al.—Exfoliated Block Copolymer/Silicate Nanocomposites by One-Pot, One-Step in-Situ Living Polymerization from Silicate-Anchored Multifunctional Initiator—Macromolecules 2006, 39, 5052-5053.
Marc W. Weiner et al.—Direct Synthesis of Dispersed Nanocomposites by in Situ Living Free Radical Polymerization Using a Silicate-Anchored Initiator—J. Am. Chem. Soc. 1999, 121, 1615.
Craig J Hawker et al.—Initiating Systems for Nitroxide-Mediated "Living" Free Radical polymerizations: Synthesis and Evaluation—vol. 29, No. 16—Jul. 29, 1993—pp. 5245-5254.

* cited by examiner

*Primary Examiner* — Robert D. Harlan
(74) *Attorney, Agent, or Firm* — Young & Thompson

(57) ABSTRACT

A method for producing a polymer nanocomposite, includes: after expanding an interlayer space of a layered inorganic compound using an organic onium salt, immobilizing a radical polymerization initiator having a group represented by formula (1) on an interlayer surface of the layered inorganic compound via a covalent bond; and carrying out surface-initiated radical polymerization in a monomer from the immobilized radical polymerization initiator. Preferably, in the radical polymerization initiator having the group represented by the general formula (1), at least one of X1 to X3 in the formula is a chlorine atom, or R1 in the formula is a C1-25 alkylene group or a C2-25 alkenylene group optionally interrupted by an oxygen atom or an ester group and optionally substituted by a phenyl group:

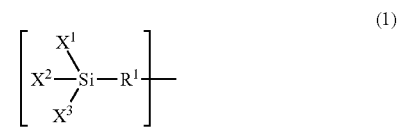

(1)

R1 represents a C1-25 alkylene group, a C2-25 alkenylene group, a C5-8 cycloalkylene group, or a C6-12 arylene group.

20 Claims, No Drawings

METHOD FOR PRODUCING POLYMER NANOCOMPOSITE, AND FLAME-RETARDANT POLYMER NANOCOMPOSITE FORMED BY THE PRODUCTION METHOD

TECHNICAL FIELD

The present invention relates to a method for producing polymer nanocomposites and a polymer nanocomposite formed by the production method.

BACKGROUND ART

Synthetic polymers (also referred to hereinafter as "resins"), such as styrene resins, epoxy resins, silicone resins, polyurethane resins, phenolic resins, urea resins, polycarbonate resins, polyester resins, polyethylene resins, polypropylene resins, polyamide resins, polyimide resins, polyvinyl alcohol resins, styrene-butadiene-styrene resins, acrylonitrile-styrene resins, ethylene propylene rubber, acrylonitrile-butadiene-styrene resins, vinylidene chloride-acrylonitrile resins, vinylidene chloride-vinyl chloride resins, and ethylene-vinyl acetate resins, have already found use in various applications. Materials having the properties of inorganic compounds, such as high strength, high elastic modulus, heat resistance, and electric properties, while retaining the properties of polymers, such as flexibility, low specific gravity, and formability, are under active development as means for improving the various properties of resins, such as mechanical properties, heat resistance, and flame-retardant properties. So-called polymer nanocomposites—i.e., composite materials employing inorganic particles wherein at least one of the three dimensions thereof is in the nanoscale range—are receiving attention as such means for improving the resin properties, replacing conventional resins reinforced with fiberglass, talc, etc.

Examples of such conventionally-used inorganic compounds include clay minerals, such as layered inorganic compounds. Clay minerals, however, have poor dispersibility to polymers. To tackle this problem, Patent Document 1, for example, proposes a method of displacing alkali metal ions contained in a layered inorganic compound with organic onium ions and making the compound organic, to facilitate the dispersion of the compound into polymers and improve the polymers' mechanical properties.

The method of Patent Document 1, however, is still not at a satisfactory level, and there still have been demands for methods of producing polymer nanocomposites capable of improving both mechanical properties and heat resistance of the polymer matrix at the same time.

Against this backdrop, studies are being conducted on a technique of starting radical polymerization in a monomer from the interlayer surface of a layered inorganic compound (called "surface-initiated radical polymerization") to cause interlayer exfoliation and improve the dispersibility of the layered inorganic compound to resins. Non-Patent Documents 1 to 3 disclose methods of synthesizing polystyrene nanocomposites using montmorillonite modified with organic ammonium salts having the ability of initiating living free radical polymerization. The disclosed nanocomposites, however, have drawbacks in that the organic ammonium salts have poor heat resistance and that it takes a long time for the polymerization.

The same goes for azo-based polymerization initiators: all known methods for immobilizing azo-based polymerization initiators onto the interlayer surface of layered inorganic compounds also involve introduction of an onium salt, such as an ammonium salt, into the azo-based polymerization initiator's molecule and immobilization thereof by utilizing electrostatic effects, thus giving rise to the above-described drawbacks regarding heat resistance etc. In addition, because the molecular weight distribution is not controlled as contrasted with living free radical polymerization initiators (Non-Patent Documents 1 and 2), the molecular weight distribution tends to become broad. Controlled molecular weight distribution intimately relates to the exfoliation and dispersion of layered inorganic compounds: a narrow molecular weight distribution means that the polymer will grow uniformly from the interlayer surface, which will contribute to the exfoliation and dispersion of the layered inorganic compound. In other words, a narrow molecular weight distribution benefits the exfoliation and dispersion of layered inorganic compounds, whereas polymers with a broad molecular weight distribution without controlled polymer growth tend to result in incomplete exfoliation and dispersion of layered inorganic compounds.

CITATION LIST

Patent Documents

Patent Document 1: JP-A-2004-51817

Non-Patent Documents

Non-Patent Document 1: D. Y. Sogah, et al., Macromole., 39, 5052 (2006)
Non-Patent Document 2: D. Y. Sogah, et al., J. Am. Chem. Soc., 121, 1615 (1999)
Non-Patent Document 3: C. J. Hawker, et al., Macromole., 29, 5245 (1996)

SUMMARY OF INVENTION

Technical Problem

An object of the present invention is to provide a method capable of producing, in a short time, a polymer nanocomposite in which the dispersibility of layered inorganic compounds to synthetic polymers—especially radically-polymerized polymers—is favorable and that has high molecular weight components and a narrow molecular weight distribution, by carrying out surface-initiated radical polymerization in a monomer from the interlayer surface, and also provide a method capable of producing a polymer nanocomposite in which the polymer has excellent heat resistance (thermal decomposition temperature) and flame-retardant properties.

Solution to Problem

In view of the above, Inventors have made diligent research to arrive at the present invention. That is, in this invention, the interlayer space of a layered inorganic compound is expanded using an organic onium salt, and then, a specific polymerization initiator is immobilized on the interlayer surface of the layered inorganic compound via a covalent bond. In this way, the organic onium salt used for the interlayer expansion can be removed from the system. Further, in the present invention, surface-initiated radical polymerization is carried out in a monomer from the specific polymerization initiator immobilized on the interlayer surface via the covalent bond, which allows polymerization to be achieved in a short time. Furthermore, Inventors have found that polymer nanocomposites made by the present production method have high molecular weight components and a narrow molecular weight distribution, exhibit improved dispersibility of the layered inorganic compound into the polymer, and can also improve the heat resistance and flame-retardant properties of the polymer matrix.

A first aspect of the invention is a method for producing a polymer nanocomposite, including: after expanding an interlayer space of a layered inorganic compound using an organic onium salt, immobilizing a radical polymerization initiator having a group represented by general formula (1) shown below on an interlayer surface of the layered inorganic compound via a covalent bond; and carrying out surface-initiated radical polymerization in a monomer from the immobilized radical polymerization initiator:

[Chem. 1]

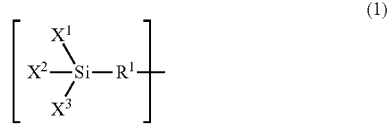

(1)

wherein, $R^1$ represents a $C_{1-25}$ alkylene group, a $C_{2-25}$ alkenylene group, a $C_{5-8}$ cycloalkylene group, or a $C_{6-12}$ arylene group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each independently represent a halogen atom, a hydroxy group, a methyl group, an ethyl group, a methyloxy group, or an ethyloxy group.

A second aspect of the invention is a polymer nanocomposite production method according to the first aspect of the invention, wherein, in the radical polymerization initiator having the group represented by the general formula (1), at least one of $X^1$ to $X^3$ in the formula is a chlorine atom.

A third aspect of the invention is a polymer nanocomposite production method according to the first or second aspect of the invention, wherein, in the radical polymerization initiator having the group represented by the general formula (1), $R^1$ in the formula is a $C_{1-25}$ alkylene group or a $C_{2-25}$ alkenylene group optionally interrupted by an oxygen atom or an ester group and optionally substituted by a phenyl group.

A fourth aspect of the invention is a polymer nanocomposite production method according to any one of the first to third aspects of the invention, wherein a layered polysilicate selected from a group consisting of magadiite, kenyaite, makatite, kanemite, and ilerite is used as the layered inorganic compound.

A fifth aspect of the invention is a polymer nanocomposite production method according to any one of the first to fourth aspects of the invention, wherein the radical polymerization initiator having the group represented by the general formula (1) and a silane compound represented by general formula (2) shown below are used in combination as compounds to be immobilized on the interlayer surface of the layered inorganic compound via covalent bonds:

[Chem. 2]

(2)

wherein, $R^2$ represents a $C_{1-25}$ alkyl group, a $C_{2-25}$ alkenyl group, a $C_{5-8}$ cycloalkyl group, or a $C_{6-12}$ aryl group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each represent the same groups as $X^1$ to $X^3$ in the general formula (1).

A sixth aspect of the invention is a polymer nanocomposite production method according to the fifth aspect of the invention, wherein, in the silane compound represented by the general formula (2), at least one of $X^1$ to $X^3$ in the formula is a chlorine atom.

A seventh aspect of the invention is a polymer nanocomposite production method according to any one of the first to sixth aspects of the invention, wherein a nitroxide-based or azo-based polymerization initiator is used as the radical polymerization initiator having the group represented by the general formula (1).

An eighth aspect of the invention is a polymer nanocomposite production method according to the seventh aspect of the invention, wherein a tetramethylpiperidine oxide-based compound represented by general formula (3) shown below is used as the nitroxide-based polymerization initiator:

[Chem. 3]

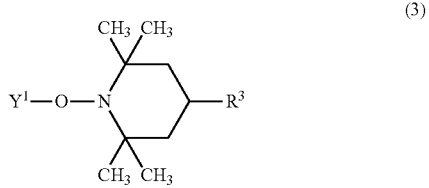

(3)

wherein, $Y^1$ represents the group represented by the general formula (1); and $R^3$ represents a hydrogen atom, an oxygen atom, a hydroxy group, a $C_{1-8}$ straight-chain or branched alkyl group, a $C_{1-8}$ alkoxy group, or a $C_{5-8}$ cycloalkyl group, the alkyl group or the alkoxy group being optionally interrupted by an oxygen atom, a sulfur atom, a carbonyl group, an ester group, an amide group, or an imino group, the substitution and the interruption being optionally combined with each other.

A ninth aspect of the invention is a polymer nanocomposite production method according to the eighth aspect of the invention, wherein, in the tetramethylpiperidine oxide-based compound represented by the general formula (3), $R^3$ in the formula is a hydrogen atom, an oxygen atom, or a $C_{1-8}$ alkoxy group.

A tenth aspect of the invention is a polymer nanocomposite production method according to the seventh aspect of the invention, wherein an azo-based compound represented by general formula (4) shown below is used as the azo-based polymerization initiator:

[Chem. 4]

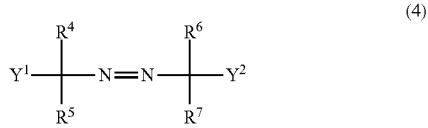

wherein, $Y^1$ represents the group represented by the general formula (1); $Y^2$ represents the group represented by the general formula (1) or a methyl group; and $R^4$ to $R^7$ each independently represent a methyl group or a nitrile group.

An eleventh aspect of the invention is a polymer nanocomposite production method according to the tenth aspect of the invention, further including: adding, to the monomer, at least one of a nitroxide-based compound, an alkoxyamine-based compound, or an iodine-based compound as a molecular weight adjuster when performing the surface-initiated radical polymerization reaction from the azo-based compound represented by the general formula (4) immobilized on the interlayer surface of the layered inorganic compound.

A twelfth aspect of the invention is a polymer nanocomposite production method according to any one of the first to eleventh aspects of the invention, wherein an organic ammonium salt, an organic pyridinium salt, an organic imidazolium salt, an organic phosphonium salt, or an organic sulfonium salt is used as the organic onium salt.

A thirteenth aspect of the invention is a polymer nanocomposite made by the polymer nanocomposite production method according to any one of the first to twelfth aspects of the invention.

A fourteenth aspect of the invention is a polymer nanocomposite according to the thirteenth aspect of the invention, characterized by being used as a flame-retardant material.

Advantageous Effects of Invention

The production method of the invention can improve the dispersibility of layered inorganic compounds into synthetic polymers, especially radically-polymerized polymers, can also improve the heat resistance (thermal decomposition temperature) and flame-retardant properties of such polymers, and can also produce polymer nanocomposites having high molecular weight components and a narrow molecular weight distribution in a short polymerization time.

DESCRIPTION OF EMBODIMENTS

The invention will be described in detail below according to preferred embodiments thereof.

The layered inorganic compound usable in the present invention is not particularly limited as long as it contains exchangeable metal cations (positive ions), such as sodium ions, in its interlayer space and a reactive hydroxyl group on its interlayer surface. Preferred examples include layered polysilicates, and concrete examples include magadiite ($Na_2O.14SiO_2.10H_2O$), kenyaite ($Na_2O.22SiO_2.10H_2O$), makatite ($Na_2O.4SiO_2.5H_2O$), kanemite ($Na_2O.4SiO_2.7H_2O$), and ilerite ($Na_2O.8SiO_2.9H_2O$). Among the above, magadiite is particularly preferable because it can be synthesized under relatively mild conditions according to usual methods and in a short time.

The organic onium salt used in the present invention is exchanged with the cations, such as sodium, existing in the interlayer space of the layered inorganic compound, thus expanding the interlayer space of the layered inorganic compound and facilitating intake, into the interlayer space, of the polymerization initiator having a group represented by the general formula (1). Examples of organic onium salts include salts of organic ammonium, organic pyridinium, organic imidazolium, organic phosphonium, organic oxonium, organic sulfonium, organic sulfoxonium, organic selenonium, organic carbonium, organic diazonium, organic iodonium, organic pyrylinium, organic pyrrolidinium, organic carbenium, organic acylium, organic thiazolinium, organic arsonium, organic stibonium, or organic telluronium. Preferable among the above are salts of organic ammonium, organic pyridinium, organic imidazolium, organic phosphonium, or organic sulfonium. The onium salts may be used singly, or two or more types may be used in combination. Concrete examples include Compounds Nos. 1 to 10 below, although the invention is not limited thereto.

<Organic Ammonium Salt>

[Chem. 5]

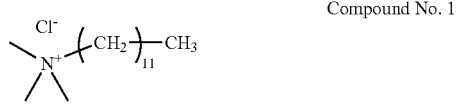

Compound No. 1

[Chem. 6]

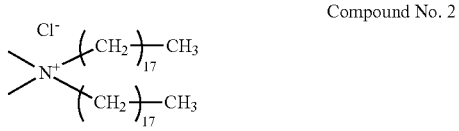

Compound No. 2

[Chem. 7]

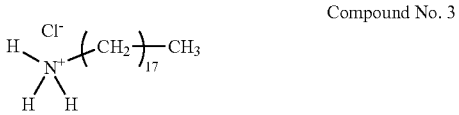

Compound No. 3

<Organic Pyridinium Salt>

[Chem. 8]

Compound No. 4

[Chem. 9]

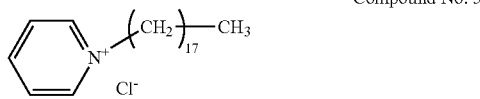

Compound No. 5

<Organic Imidazolium Salt>

[Chem. 10]

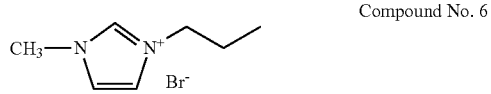

Compound No. 6

[Chem. 11]

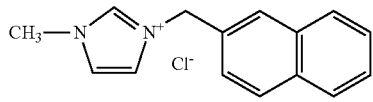

Compound No. 7

<Organic Phosphonium Salt>

[Chem. 12]

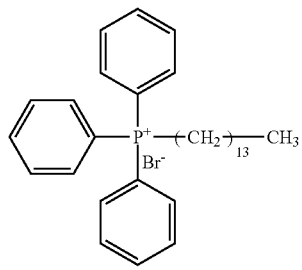

Compound No. 8

<Organic Sulfonium Salt>

[Chem. 13]

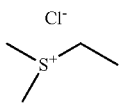

Compound No. 9

[Chem. 14]

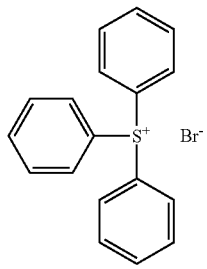

Compound No. 10

The organic onium salt used in the invention is preferably used in amounts that can displace the exchangeable metal cations, such as sodium ions, existing in the interlayer space of the layered inorganic compound; in cases where a layered polysilicate is used as the layered inorganic compound, it is preferable to use 10 to 1500 meq/100 g of the organic onium salt, and in cases where magadiite is used as the layered polysilicate, it is preferable to use 10 to 1000 meq/100 g of the organic onium salt.

The reaction temperature and time for intercalation of the organic onium salt into the interlayer space of the layered inorganic compound by cation exchange depend on the types of layered inorganic compound and organic onium salt. In ultrasonic irradiation or stirring, the reaction temperature condition ranges preferably from room temperature to 100° C., more preferably from room temperature to 50° C., and the reaction time ranges preferably from 2 to 72 hours.

The polymerization initiator used in the invention is immobilized, via a covalent bond, on the interlayer surface of the layered inorganic compound which has been expanded by the organic onium salt. The polymerization initiator includes a group represented by the general formula (1). Examples of the $C_{1-25}$ alkylene group represented by $R^1$ in the general formula (1) include methylene, ethylene, propylene, isopropylene, butylene, sec-butylene, tert-butylene, pentylene, hexylene, heptylene, octylene, tert-octylene, ethylhexylene, nonylene, isononylene, decylene, isodecylene, dodecylene, tridecylene, tetradecylene, pentadecylene, hexadecylene, heptadecylene, octadecylene, nonadecylene, eicosylene, heneicosylene, docosylene, tricosylene, tetracosylene, and pentacosylene.

Examples of the $C_{2-25}$ alkenylene group represented by $R^1$ in the general formula (1) include ethenylene, propenylene, isopropenylene, butenylene, sec-butenylene, tert-butenylene, pentenylene, hexenylene, heptenylene, octenylene, tert-octenylene, ethylhexenylene, nonenylene, isononenylene, decenylene, isodecenylene, dodecenylene, tridecenylene, tetradecenylene, pentadecenylene, hexadecenylene, heptadecenylene, octadecenylene, nonadecenylene, eicosenylene, heneicosenylene, docosenylene, tricosenylene, tetracosenylene, and pentacosenylene.

Examples of the $C_{5-8}$ cycloalkylene group represented by $R^1$ in the general formula (1) include cyclopentylene, cyclohexylene, cycloheptylene, and cyclooctylene.

Examples of the $C_{6-12}$ arylene group represented by $R^1$ in the general formula (1) include phenylene, tolylene, xylylene, naphthylene, and biphenylene.

Examples of the $C_{1-18}$ alkyl group that may optionally substitute the alkylene group, cycloalkylene group, or arylene group represented by $R^1$ in the general formula (1) include methyl, ethyl, propyl, isopropyl, butyl, sec-butyl, tert-butyl, pentyl, hexyl, heptyl, octyl, isooctyl, tert-octyl, 2-ethylhexyl, nonyl, isononyl, decyl, isodecyl, dodecyl, tridecyl, tetradecyl, pentadecyl, hexadecyl, heptadecyl, and octadecyl.

From the standpoint of ease of synthesis, material cost, and compatibility with the monomer to be polymerized, $R^1$ in the general formula (1) is preferably a $C_{1-25}$ alkylene group or a $C_{2-25}$ alkenylene group optionally interrupted by an oxygen atom or an ester group and optionally substituted by a phenyl group.

$X^1$ to $X^3$ in the general formula (1) each represent a halogen atom, a hydroxy group, a methyl group, an ethyl group, a methyloxy group, or an ethyloxy group. From the standpoint of material cost and reactivity in forming the covalent bond with the hydroxy groups present on the interlayer surface, at least one of $X^1$ to $X^3$ is preferably a chlorine atom.

Concrete examples of the radical polymerization initiator having the group represented by the general formula (1) include the following Compounds Nos. 11 to 27, although the invention is not limited thereto.

[Chem. 15]
Compound No. 11
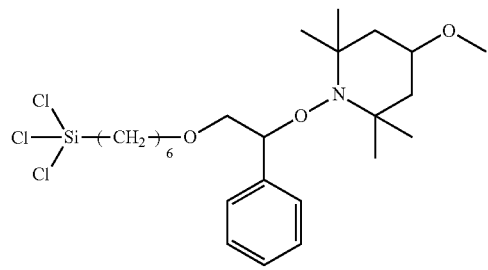
[Chem. 16]
Compound No. 12
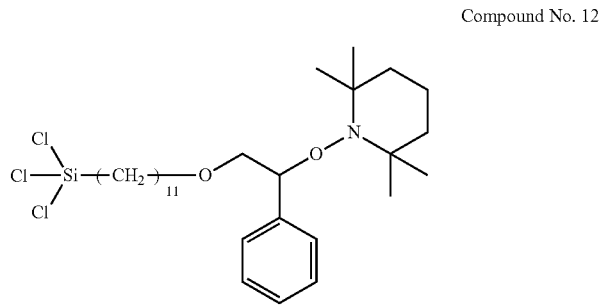
[Chem. 17]
Compound No. 13
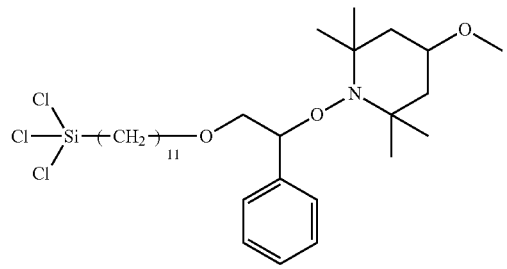
[Chem. 18]
Compound No. 14
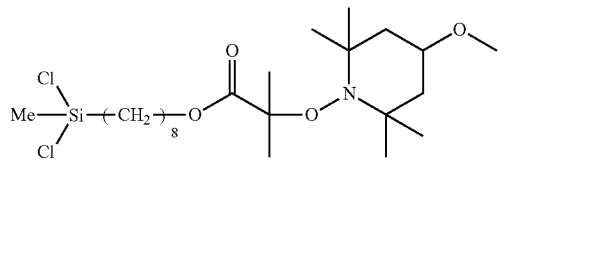
[Chem. 19]
Compound No. 15
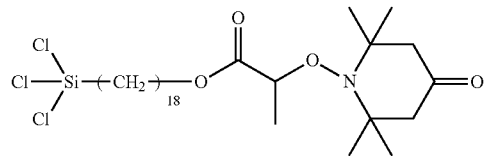
[Chem. 20]
Compound No. 16
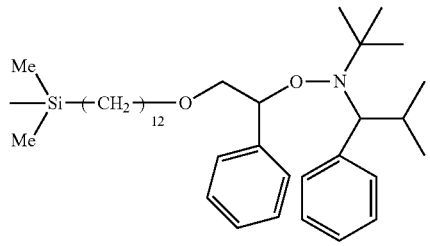
[Chem. 21]
Compound No. 17
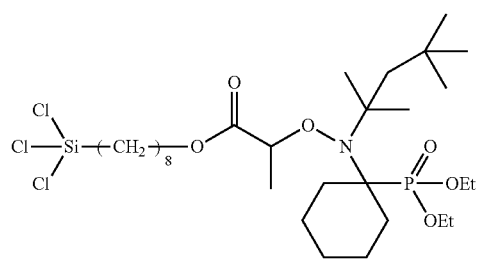
[Chem. 22]
Compound No. 18
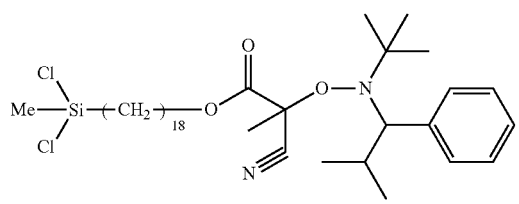
[Chem. 23]
Compound No. 19
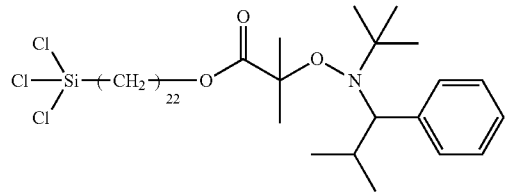
[Chem. 24]
Compound No. 20
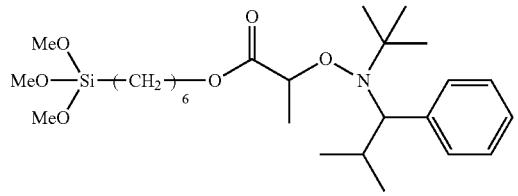

Compound No. 21
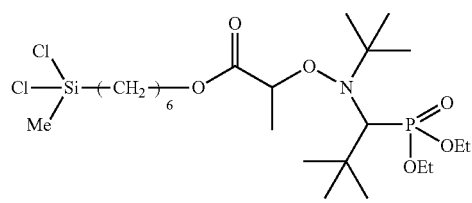

Compound No. 22
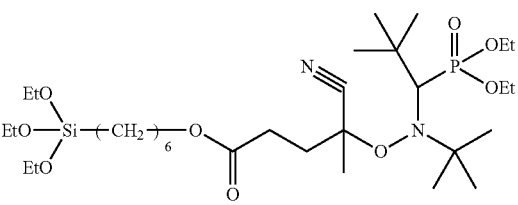

Compound No. 23
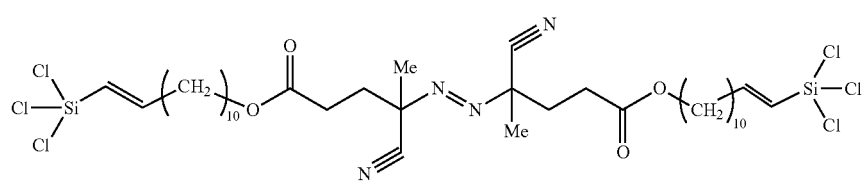

Compound No. 24
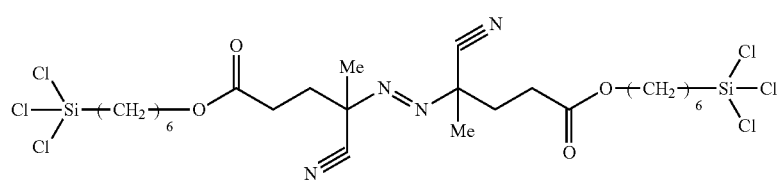

Compound No. 25
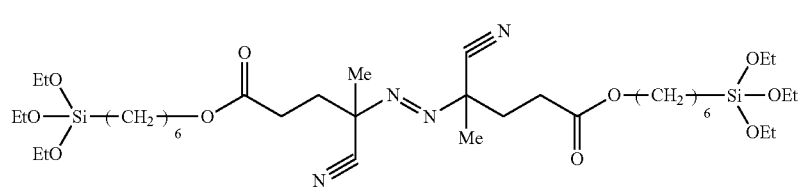

Compound No. 26
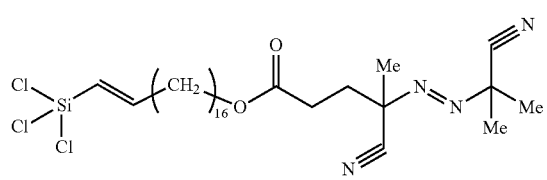

Compound No. 27
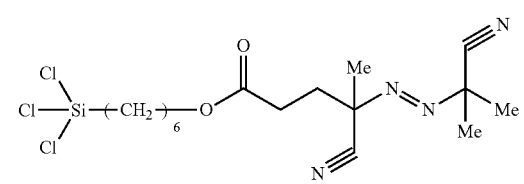

The radical polymerization initiator having the group represented by the general formula (1) is obtained by reacting a generally-used radical polymerization initiator with a silane compound having the group represented by the general formula (1). The generally-used radical polymerization initiator is not particularly limited, and examples include: peroxide-based compounds such as tert-butyl hydroperoxide, di-tert-butyl peroxide, benzoyl peroxide, potassium persulfate, and lauroyl peroxide; nitroxide-based compounds such as tetramethylpiperidine oxide-based compounds; and azo-based compounds such as dimethyl azobis-isobutyrate, 2,2'-azobis-isobutyronitrile, and 2,2'-azobis-dimethylvaleronitrile.

From the standpoint of ease of synthesis, etc., the radical polymerization initiator having the group represented by the general formula (1) is preferably a compound obtained by reacting a nitroxide-based compound with a silane compound having the group represented by the general formula (1) (also referred to hereinafter as "nitroxide-based polymerization initiator" of the invention) or a compound obtained by reacting an azo-based compound with a silane compound having the group represented by the general formula (1) (also referred to hereinafter as "azo-based polymerization initiator" of the invention).

Examples of the nitroxide-based polymerization initiator of the invention include tetramethylpiperidine oxide-based compounds represented by the general formula (3). Examples of the $C_{1-8}$ straight-chain or branched alkyl group represented by $R^3$ in the general formula include methyl, ethyl, propyl, isopropyl, n-butyl, sec-butyl, tert-butyl, pentyl, hexyl, heptyl, octyl, tert-octyl, and ethylhexyl.

Examples of the $C_{1-8}$ alkoxy group represented by $R^3$ in the general formula (3) include straight-chain or branched alkoxy groups such as methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, and 2-ethylhexyloxy. Preferred among the above are groups with shorter chains from the standpoint of ease of reaction and cost efficiency, and methyloxy or ethyloxy is more preferable.

Examples of the $C_{5-8}$ cycloalkyl group represented by $R^3$ in the general formula (3) include cyclopentyl, cyclohexyl, cycloheptyl, and cyclooctyl.

From the standpoint of material cost and ease of synthesis, $R^3$ in the general formula (3) is preferably a hydrogen atom, an oxygen atom, or a $C_{1-8}$ alkoxy group.

Concrete examples of the compounds represented by the general formula (3) include the above-described Compounds Nos. 11 to 15, although the invention is not limited thereto.

Examples of the azo-based polymerization initiator of the invention include azo-based compounds represented by the general formula (4). Concrete examples of the compounds represented by the general formula (4) include the above-described Compounds Nos. 23 to 27, although the invention is not limited thereto.

The method for synthesizing the radical polymerization initiator having the group represented by the general formula (1) is not particularly limited. Examples of methods for synthesizing tetramethylpiperidine oxide-based compounds include synthesis by subjecting tetramethylpiperidine oxide to benzoylation, hydrolysis, etherification, and hydrosilylation, in this order. Examples of methods for synthesizing azo-based compounds include methods disclosed in B. Zhao, W. J. Brittain, *Prog. Polym. Sci.*, 25, (2000), 677-710.

When immobilizing, via a covalent bond, the radical polymerization initiator having the group represented by the general formula (1) onto the interlayer surface of the layered inorganic compound, it is preferable to use a silane compound represented by the general formula (2) in combination with the radical polymerization initiator having the group represented by the general formula (1), from the standpoint of material cost reduction.

Examples of the $C_{1-25}$ alkyl group represented by $R^2$ in the general formula (2) include methyl, ethyl, propyl, isopropyl, butyl, sec-butyl, tert-butyl, pentyl, hexyl, heptyl, octyl, tert-octyl, ethylhexyl, nonyl, isononyl, decyl, isodecyl, dodecyl, tridecyl, tetradecyl, pentadecyl, hexadecyl, heptadecyl, octadecyl, nonadecyl, eicosyl, heneicosyl, docosyl, tricosyl, tetracosyl, and pentacosyl.

Examples of the $C_{2-25}$ alkenyl group represented by $R^2$ in the general formula (2) include ethenyl, propenyl, isopropenyl, butenyl, sec-butenyl, tert-butenyl, pentenyl, hexenyl, heptenyl, octenyl, tert-octenyl, ethylhexenyl, nonenyl, isononenyl, decenyl, isodecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, and pentacosenyl.

Examples of the $C_{5-8}$ cycloalkyl group represented by $R^2$ in the general formula (2) in the invention include cyclopentyl, cyclohexyl, cycloheptyl, and cyclooctyl.

Examples of the $C_{6-12}$ aryl group represented by $R^2$ in the general formula (2) in the invention include phenyl, toluoyl, xylyl, naphthyl, and biphenyl.

Concrete examples of the silane compound represented by the general formula (2) in the invention include the following Compounds Nos. 28 to 30, although the invention is not limited thereto.

[Chem. 32]

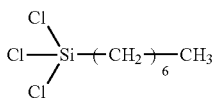

Compound No. 28

[Chem. 33]

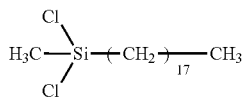

Compound No. 29

[Chem. 34]

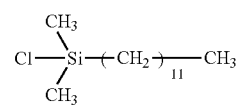

Compound No. 30

The radical polymerization initiator having the group represented by the general formula (1) and the silane compound represented by the general formula (2) may be mixed at any ratio, but from the standpoint of material cost, it is preferable that the proportion of the radical polymerization initiator having the group represented by the general formula (1) is smaller, and further, from the standpoint of polymerization initiation efficiency, it is more preferable that the molar ratio (the radical polymerization initiator having the group represented by the general formula (1): the silane compound represented by the general formula (2)) is from 0.1:99.9 to 40:60.

In the present invention, the method for immobilizing the radical polymerization initiator having the group represented by the general formula (1), or the silane compound represented by the general formula (2), onto the interlayer surface of the layered inorganic compound via covalent bonds is not particularly limited, and different methods may be used depending on the radical polymerization initiator to be used and/or the reactivity of the silane compound. For example, silylation may be achieved through reaction in an inactive solvent, such as benzene, toluene, xylene, or hexane, for 1 to 100 hours at temperatures ranging from room temperature to the solvent's reflux temperature.

In the present invention, the usage amount of the radical polymerization initiator having the group represented by the general formula (1), or the silane compound represented by the general formula (2), is usually around 0.01 to 100 mmol, preferably around 1 to 50 mmol, with respect to 1 g of the layered inorganic compound having its interlayer space modified with the organic onium salt.

In the present invention, surface-initiated polymerization is carried out in a monomer using, singly, the radical polymerization initiator having the group represented by the general formula (1) immobilized onto the interlayer surface of the layered inorganic compound, or in combination with the silane compound represented by the general formula (2). In cases where the azo-based compound represented by the general formula (4) is used as the radical polymerization initiator having the group represented by the general formula (1), it is preferable to also add, to the monomer, a molecular weight adjuster such as a nitroxide-based compound, an alkoxyamine-based compound, or an iodine-based compound, such as iodoform or iodoacetonitrile, when performing the surface-initiated radical polymerization reaction. Concrete examples thereof include the following Compounds Nos. 31 to 37, although the invention is not limited thereto.

[Chem. 35] 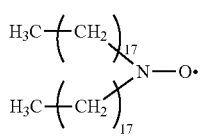 Compound No. 31

[Chem. 36] 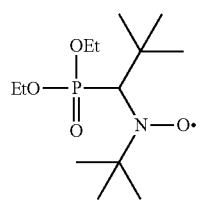 Compound No. 32

[Chem. 37] 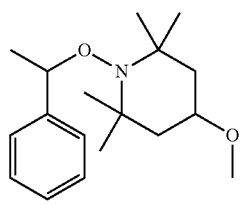 Compound No. 33

[Chem. 38] 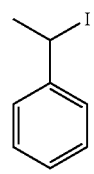 Compound No. 34

[Chem. 39] 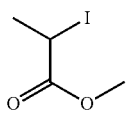 Compound No. 35

[Chem. 40] 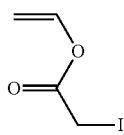 Compound No. 36

[Chem. 41] 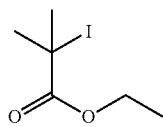 Compound No. 37

The amount of the molecular weight adjuster to be used in the present invention differs depending on the type of molecular weight adjuster, the chemical structure thereof, the type of the polymerizable monomer, and the polymerization method, but it is preferable to use around 0.01 to 10 equivalents by mole, more preferably around 0.1 to 5 equivalents by mole, with respect to 1 mole of the polymerization initiator used.

The monomer/s to be used for the surface-initiated polymerization is/are not particularly limited, and any compound may be used as long as the compound has a radically-polymerizable ethylenically unsaturated group in its molecule. Examples include such monomers as maleic anhydride, vinylidene cyanide, tetrafluoroethylene, acrylonitrile, acrylic acid, α-cyanomethyl acrylate, methyl acrylate, acrylamide, methyl methacrylate, butyl methacrylate, vinyl chloride, ethylene, butadiene, isoprene, styrene, α-methylstyrene, vinyl acetate, isobutene, vinyl pyridine, vinyl carbazole, isobutyl vinyl ether, and vinyl acetate. Synthetic resins obtained therefrom include resins obtained by (co)polymerizing one, or two or more types, of the above-described monomers, and examples include styrene resin, vinylester resin, vinyl chloride resin, unsaturated polyester resin, diallyl phthalate, various acrylates, maleimide resin, polyolefin resin, polyvinyl alcohol resin, styrene-butadiene-styrene resin, acrylonitrile-styrene resin, ethylene propylene rubber, acrylonitrile-butadiene-styrene resin, vinylidene chloride-acrylonitrile resin, vinylidene chloride-vinyl chloride resin, and ethylene-vinyl acetate resin.

The amount of the present layered inorganic compound to be blended to the above-described synthetic resin is not particularly limited, but is preferably 0.1% to 40% by mass, more preferably 1% to 20% by mass. An amount exceeding 40% by mass may give rise to a tendency to impair the mechanical properties, such as impact strength, of the synthetic resin; whereas an amount of less than 0.1% by mass may not allow the effects of producing a nanocomposite to be exerted, such as improvement of heat resistance and flame-retardant properties.

The reaction temperature and time for the surface-initiated radical polymerization in the invention will differ depending on the types of polymerization initiator, monomer, etc., to be used and on the polymerization method. Thus, depending thereon, generally-employed conditions may be selected as appropriate, but preferably, the reaction temperature ranges from −30° C. to 180° C. and the reaction time ranges from 1 to 24 hours.

The surface-initiated radical polymerization of the invention can be carried out by general polymerization methods, examples including: heterogeneous polymerization, such as emulsion polymerization, dispersion polymerization, or suspension polymerization; bulk polymerization; and solution polymerization. Preferred among the above is bulk polymerization carried out in a monomer or solution polymerization carried out in an appropriate organic solvent. Examples of the appropriate organic solvent for solution polymerization include inactive solvents, such as benzene, anisole, and hexane.

The polymer nanocomposite made by the production method of the invention includes high molecular weight components, has a narrow molecular weight distribution, and has excellent mechanical properties, heat resistance, and/or flame-retardant properties. Therefore, the present polymer nanocomposite can be used in a wide variety of applications, such as components for office-automation equipment and construction materials, materials for structuring vehicles such as cars and airplanes, display panels and films for liquid crystal TVs etc., and household goods made of polymeric materials.

EXAMPLES

The present invention will be described in further detail below according to
Examples and Comparative Examples. The invention, however, is not to be limited thereto.

Production Example 1

Synthesis of Polymerization Initiator

Production Example 1-1

Radical Polymerization Initiator: Synthesis of Compound No. 11

I. First Reaction: (Methylation)

To a dimethylformamide solvent were mixed 62 g of 2,2,6,6-tetramethyl-1-oxy-4-hydroxypiperidine ("ADK STAB LA-7RD"; product of Adeka Corporation), 37 mL of iodomethane, and 24 g of 55% sodium hydride, and the mixture was stirred at room temperature for 24 hours. The reaction product was purified, to yield Compound a.

[Chem. 42]

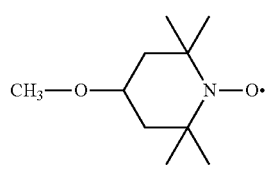

Compound a

II. Second Reaction: (Benzoylation)

To 14.9 g of the Compound a were mixed 300 mL of a styrene monomer and 13.8 g of 70% benzoyl peroxide, and the mixture was stirred at 90° C. for 18 hours. The reaction product was purified, to yield Compound b.

[Chem. 43]

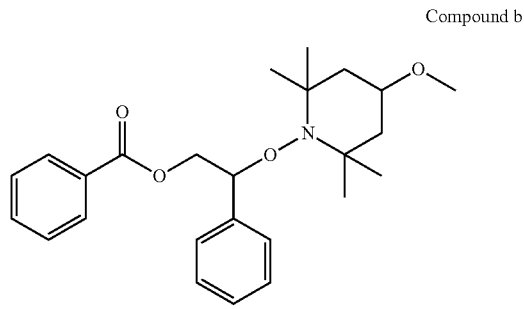

Compound b

III. Third Reaction: (Hydrolysis)

To 300 mL of ethanol were added 4.3 g of the Compound b and 1.2 g/30 mL of sodium hydroxide aqueous solution, and the mixture was stirred at room temperature for 24 hours. The reaction product was purified, to yield Compound c.

[Chem. 44]

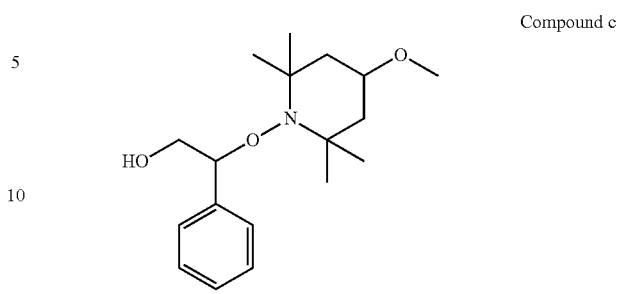

Compound c

IV. Fourth Reaction: (Etherification)

To 4.9 g of the Compound c were added 2.8 mL of 6-bromo-1-hexene and 0.9 g of 55% sodium hydride, the mixture was mixed with 70 mL of dimethylformamide and was stirred at room temperature for 24 hours. The reaction product was purified, to yield Compound d.

[Chem. 45]

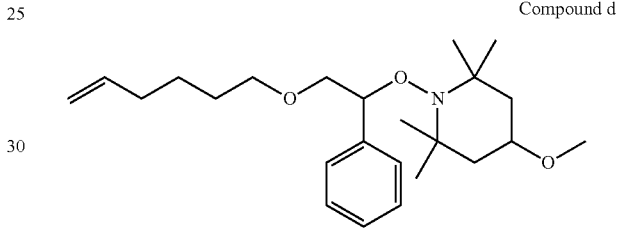

Compound d

V. Fifth Reaction: (Hydrosilylation)

To 5.02 g of the Compound d were added 6.6 mL of trichlorosilane and 20 mg of a Pt catalyst, and the mixture was stirred at 30° C. for 5 hours. The reaction product was purified, to yield the target Compound No. 11.

Production Example 1-2

Radical Polymerization Initiator: Synthesis of Compound No. 12

The above Compound No. 12 was produced according to the same conditions as in Steps II to V of the Production Example 1-1, except that 2,2,6,6-tetramethyl-1-oxypiperidine was used as the starting material and 11-bromo-1-undecene was used in place of 6-bromo-1-hexene in Step 1V (Etherification) of Production Example 1-1.

Production Example 1-3

Radical Polymerization Initiator: Synthesis of Compound No. 13

The above Compound No. 13 was produced according to the same conditions as in Steps 11 to V of the Production Example 1-1, except that 11-bromo-1-undecene was used in place of 6-bromo-1-hexene in Step IV (Etherification) of Production Example 1-1.

Example 1

I. Synthesis of Magadiite

To an autoclave were placed 22.5 g of silica gel (product of Wako Pure Chemical Industries, Ltd.), 4.3 g of sodium hydroxide, and 125 g of distilled water, and hydrothermal synthesis was carried out at temperatures between 165° C. and 170° C. for 18 hours. The reaction was terminated after observing the reaction solution with a field-emission scanning electron microscope (FE-SEM) to see that there were no spherical silica particles, and with symmetric reflection X-ray diffraction (XRD) (using "RINT2200"; product from Rigaku Co., Ltd.) to see that there were diffraction peaks ascribable to the basal spacing d(001) of magadiite and to examine other diffraction peaks ascribable to magadiite. The solid obtained was purified and dried under reduced pressure at 100° C. for 12 hours, to yield magadiite ($Na_2O.14SiO_2.10H_2O$).

II. Cation Exchange with Organic Onium Salt

Through cation exchange, 2.5 g of dodecyltrimethylammonium chloride (the above Compound No. 1; product of Tokyo Chemical Industry Co., Ltd.; referred to hereinafter as "DTMA") was intercalated into 5 g of magadiite obtained as above. The resultant solid was purified and dried in a vacuum at room temperature for 12 hours, to yield a solid powder. The solid powder obtained was identified through XRD and elementary analysis, to find that the solid powder obtained was DTMA-magadiite.

III. Interlayer Modification

To 40 mL of toluene was dispersed 1.0 g of the DTMA-magadiite obtained as above, and to this toluene solution was added 10 mmol of the above Compound No. 11. The mixture was stirred at room temperature for 100 hours, to immobilize the polymerization initiator. The reaction product was purified and dried in a vacuum at room temperature for at least 12 hours, to yield a layered inorganic compound having the radical polymerization initiator immobilized onto the interlayer surface.

IV. Production of Polymer Nanocomposite

To an argon-replaced hermetic reaction vessel were placed 6 g of the polymerization-initiator-immobilized layered inorganic compound and 68 g of styrene monomer and the mixture was allowed to react at 125° C. for 2 hours. The reaction product was purified and dried in a vacuum at room temperature for at least 12 hours, to yield a polystyrene-magadiite nanocomposite.

V. Evaluation of Polymer Nanocomposite

The polymer nanocomposite obtained as above was evaluated as to its state of aggregation, number-average molecular weight, molecular weight distribution, thermal decomposition temperature, silicate content, and flame-retardant properties (maximum heat release rate). The results are shown in Table 1.

Examples 2 and 3

Respective polymer nanocomposites were produced according to the same production method, except that the organic onium salt used in Step II and the interlayer-modifying compound used in Step III in the above Example 1 were replaced with the respective interlayer-modifying compounds shown in Table 1 below, and the nanocomposites were evaluated according to the same evaluation methods. The results are shown in Table 1.

Example 4

A polymer nanocomposite was produced according to the same production method, except that the organic onium salt used in Step II in the above Example 1 was replaced with Compound No. 8, the interlayer-modifying compound in Step III was replaced with an interlayer-modifying compound using the above Compound No. 23 and Compound No. 29 (octadecylmethyldichlorosilane) in combination (combining ratio (ratio by mmol of former/latter): 10/90), and 130 mg of the above Compound No. 34 was also added as a molecular weight adjuster in Step IV and the reaction was carried out at 70° C. The polymer nanocomposite was evaluated according to the same evaluation methods. The results are shown in Table 1.

Example 5

A polymer nanocomposite was produced according to the same production method, except that the organic onium salt used in Step 11 in the above Example 1 was replaced with Compound No. 2 and the interlayer-modifying compound in Step III was replaced with an interlayer-modifying compound using the above Compound No. 11 and Compound No. 28 (octyltrichlorosilane) in combination (combining ratio (ratio by mmol of former/latter): 10/90). The polymer nanocomposite was evaluated according to the same evaluation methods. The results are shown in Table 1.

Comparative Examples 1 and 2

Respective polymer nanocomposites were produced according to the same production method, except that 6 g of a layered inorganic compound obtained by replacing the interlayer-modifying compound in Step III of the above Example 1 with the respective interlayer-modifying compounds shown in Table 1 below and 95 mg of AIBN (2,2'-azobis(isobutyronitrile) as a free polymerization initiator not immobilized onto the interlayer surface were added to 68 g of styrene monomer and the reaction was carried out at 70° C., and the nanocomposites were evaluated according to the same evaluation methods. The results are shown in Table 1.

Comparative Example 3

A polymer nanocomposite was produced according to the same production method, except that 6 g of the DTMA-magadiite obtained in Step 11 of the Example 1 and 95 mg of AIBN as a free polymerization initiator not immobilized onto the interlayer surface were added to 68 g of styrene monomer and the reaction was carried out at 70° C., and the polymer nanocomposite was evaluated according to the same evaluation methods. The results are shown in Table 1.

Comparative Example 4

An attempt was made to produce a nanocomposite resin according to the same production method, except that 6 g of magadiite obtained by the procedure as in Step I of Example 1 was used as-is without cation exchange and interlayer modification, and 95 mg of AIBN as a free polymerization initiator not immobilized onto the interlayer surface was added to 68 g of styrene monomer, and the reaction was carried out at 70° C. The product was evaluated according to the same evaluation methods. The results are shown in Table 1.

Evaluation Methods:

State of Aggregation:

A transmission electron microscope (TEM) ("Transmission Electron Microscope H7500"; product from Hitachi High-Technologies Corporation) was used to perform bright-field observation of ultra-thin sections of the nanocomposites obtained, to evaluate the state of aggregation thereof. Further, an X-ray diffractometer (SAXS, WAXD; "Ultima IV"; product from Rigaku Co., Ltd.) was used to perform SAXS and WAXD measurements on the nanocomposites obtained, to evaluate the state of exfoliation and dispersion of the layered inorganic compounds in the small-angle and wide-angle ranges.

Good: Good dispersibility without any aggregation
Poor: Insufficient dispersibility with many aggregations Molecular Weight (Mn) and Molecular Weight Distribution (Mw/Mn):

Size-exclusion chromatography (SEC) (products from JASCO Corporation; detector: "RI-830"; UV-875; column oven: "CO-865"; pump: "PU-880"; eluent: THF; polystyrene standard) was used to separate the polymers that have grown from the silicate layer surface by pretreatment with hydrofluoric acid and to measure the number-average molecular weight (Mn) and the molecular weight distribution (Mw/Mn).

Thermal Decomposition Temperature (° C.):

Measurement was performed using a thermogravimetric/differential thermal analyzer (TG-DTA; "Thermo Plus2"; product from Rigaku Co., Ltd.).

Temperature rise rate: 10° C./min
Temperature range: 30° C. to 900° C.
Nitrogen flow rate: 200 mL/min Silicate Content (%):

The weight of residue after retaining the sample in the thermogravimetric/differential thermal analyzer (TG-DTA; "Thermo Plus2"; product from Rigaku Co., Ltd.) at 900° C. for 30 minutes was regarded as the silicate content (%).

Flame-Retardant Properties:

A cone calorimeter ("Cone calorimeter III"; product from Toyo Seiki Seisaku-sho, Ltd.) was used to measure the heat release rate during combustion (HRR: $kW/m^2$) and the time for ignition (seconds) according to the following methods:

Heat Release Rate during combustion (HRR: $kW/m^2$):
Test specimen: 100×100×3 mm
Incident heat flux: 50 $kW/m^2$ Time for Ignition (seconds):

Pursuant to ISO 5660, the time required to start ignition was visually observed and measured for when the specimen was heated at a heat flux of 50 $kW/m^2$ for 15 minutes.

TABLE 1

| | | Examples | | | | | Comparative Examples | | |
|---|---|---|---|---|---|---|---|---|---|
| | 1 | 2 | 3 | 4 | 5 | 1 | 2 | 3 | 4 |
| Organic Onium Salt | Compound No. 1 | Compound No. 5 | Compound No. 7 | Compound No. 8 | Compound No. 2 | Compound No. 1 | Compound No. 1 | Compound No. 1 (DTMA) | — |
| Interlayer-Modifying Compound | Compound No. 11 | Compound No. 12 | Compound No. 13 | Compounds Nos. 23/29 | Compounds Nos. 11/28 | Compound No. 28 | Compound No. 29 | | sodium ions |
| Molecular Weight Adjuster | — | — | — | Compound No. 34 | — | — | — | — | — |
| Free Polymerization Initiator | — | — | — | — | — | AIBN | AIBN | AIBN | AIBN |
| State of Aggregation | Good | Good | Good | Good | Good | Poor | Poor | Poor | Poor |
| Number-Average Molecular Weight × $10^{-3}$ (Mn) | 281 | 301 | 325 | 262 | 274 | 86 | 92 | 105 | 78 |
| Molecular Weight Distribution (Mw/Mn) | 1.5 | 1.7 | 1.6 | 1.5 | 1.4 | 3.6 | 3.2 | 3.5 | 3.9 |
| Thermal Decomposition Temperature (° C.) | 456 | 456 | 455 | 454 | 456 | 438 | 439 | 435 | 434 |
| Silicate Content (%) | 10.0 | 10.3 | 10.2 | 10.3 | 10.2 | 10.1 | 10.3 | 10.0 | 10.0 |
| Evaluation on Flame-Retardant Properties — Max. Heat Release Rate ($kW/m^2$) | 512 | 505 | 510 | 511 | 511 | 582 | 575 | 580 | 933 |
| Evaluation on Flame-Retardant Properties — Ignition Time (sec) | 30.2 | 30.5 | 29.8 | 30.1 | 30.1 | 21.8 | 22.0 | 20.9 | 17.8 |

The results show that the polymer nanocomposites produced according to the production method of the invention—i.e., by immobilizing a radical polymerization initiator having the group represented by the general formula (1) on an interlayer surface of a layered inorganic compound and carrying out surface-initiated radical polymerization in a monomer from the interlayer surface—exhibit good exfoliation and dispersion properties of the layered inorganic compounds in the polymer matrix and have a high layered-inorganic-compound content in the polymer. It was also found that the present production method can produce high molecular weight products with a narrow molecular weight distribution in a short polymerization time. Further, it was also found that the polymers in the polymer nanocomposites produced by the present production method have improved heat resistance, and the evaluation examples exhibit favorable results in terms of reduced maximum heat release rate and delay in ignition time. This shows that the production method of the present invention can provide polymer nanocomposites with high flame-retardant properties.

The invention claimed is:

1. A method for producing a polymer nanocomposite, comprising:
   after expanding an interlayer space of a layered inorganic compound using an organic onium salt, immobilizing a radical polymerization initiator having a group represented by general formula (1) shown below on an interlayer surface of the layered inorganic compound via a covalent bond; and carrying out surface-initiated radical polymerization in a monomer from the immobilized radical polymerization initiator:

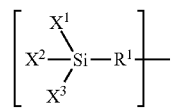
(1)

wherein, $R^1$ represents a $C_{1-25}$ alkylene group, a $C_{2-25}$ alkenylene group, a $C_{5-8}$ cycloalkylene group, or a $C_{6-12}$ arylene group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each independently represent a halogen atom, a hydroxy group, a methyl group, an ethyl group, a methyloxy group, or an ethyloxy group.

2. The polymer nanocomposite production method according to claim 1, wherein, in the radical polymerization initiator having the group represented by the general formula (1), at least one of $X^1$ to $X^3$ in the formula is a chlorine atom.

3. The polymer nanocomposite production method according to claim 1, wherein, in the radical polymerization initiator having the group represented by the general formula (1), $R^1$ in the formula is a $C_{1-25}$ alkylene group or a $C_{2-25}$ alkenylene group optionally interrupted by an oxygen atom or an ester group and optionally substituted by a phenyl group.

4. The polymer nanocomposite production method according to claim 1, wherein a layered polysilicate selected from a group consisting of magadiite, kenyaite, makatite, kanemite, and ilerite is used as the layered inorganic compound.

5. The polymer nanocomposite production method according to claim 1, wherein the radical polymerization initiator having the group represented by the general formula (1) and a silane compound represented by general formula (2) shown below are used in combination as compounds to be immobilized on the interlayer surface of the layered inorganic compound via covalent bonds:

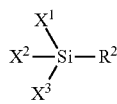
(2)

wherein, $R^2$ represents a $C_{1-25}$ alkyl group, a $C_{2-25}$ alkenyl group, a $C_{5-8}$ cycloalkyl group, or a $C_{6-12}$ aryl group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each represent the same groups as $X^1$ to $X^3$ in the general formula (1).

6. The polymer nanocomposite production method according to claim 5, wherein, in the silane compound represented by the general formula (2), at least one of $X^1$ to $X^3$ in the formula is a chlorine atom.

7. The polymer nanocomposite production method according to claim 1, wherein a nitroxide-based or azo-based polymerization initiator is used as the radical polymerization initiator having the group represented by the general formula (1).

8. The polymer nanocomposite production method according to claim 7, wherein a tetramethylpiperidine oxide-based compound represented by general formula (3) shown below is used as the nitroxide-based polymerization initiator:

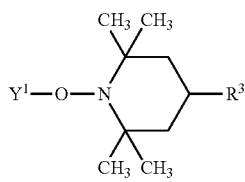
(3)

wherein, $Y^1$ represents the group represented by the general formula (1); and $R^3$ represents a hydrogen atom, an oxygen atom, a hydroxy group, a $C_{1-8}$ straight-chain or branched alkyl group, a $C_{1-8}$ alkoxy group, or a $C_{5-8}$ cycloalkyl group, the alkyl group or the alkoxy group being optionally interrupted by an oxygen atom, a sulfur atom, a carbonyl group, an ester group, an amide group, or an imino group, the substitution and the interruption being optionally combined with each other.

9. The polymer nanocomposite production method according to claim 8, wherein, in the tetramethylpiperidine oxide-based compound represented by the general formula (3), $R^3$ in the formula is a hydrogen atom, an oxygen atom, or a $C_{1-8}$ alkoxy group.

10. The polymer nanocomposite production method according to claim 7, wherein an azo-based compound represented by general formula (4) shown below is used as the azo-based polymerization initiator:

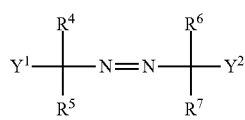
(4)

wherein, $Y^4$ represents the group represented by the general formula (1); $Y^2$ represents the group represented by the general formula (1) or a methyl group; and $R^4$ to $R^7$ each independently represent a methyl group or a nitrile group.

11. The polymer nanocomposite production method according to claim 10, further comprising: adding, to the monomer, at least one of a nitroxide-based compound, an alkoxyamine-based compound, or an iodine-based compound as a molecular weight adjuster when performing the surface-initiated radical polymerization reaction from the azo-based compound represented by the general formula (4) immobilized on the interlayer surface of the layered inorganic compound.

12. The polymer nanocomposite production method according to claim 1, wherein an organic ammonium salt, an organic pyridinium salt, an organic imidazolium salt, an organic phosphonium salt, or an organic sulfonium salt is used as the organic onium salt.

13. A polymer nanocomposite made by the polymer nanocomposite production method according to claim 1.

14. The polymer nanocomposite according to claim 13, characterized by being used as a flame-retardant material.

15. The polymer nanocomposite production method according to claim 2, wherein, in the radical polymerization initiator having the group represented by the general formula (1), $R^1$ in the formula is a $C_{1-25}$ alkylene group or a $C_{2-25}$ alkenylene group optionally interrupted by an oxygen atom or an ester group and optionally substituted by a phenyl group.

16. The polymer nanocomposite production method according to claim 2, wherein a layered polysilicate selected from a group consisting of magadiite, kenyaite, makatite, kanemite, and ilerite is used as the layered inorganic compound.

17. The polymer nanocomposite production method according to claim 3, wherein a layered polysilicate selected from a group consisting of magadiite, kenyaite, makatite, kanemite, and ilerite is used as the layered inorganic compound.

18. The polymer nanocomposite production method according to claim 2, wherein the radical polymerization initiator having the group represented by the general formula (1) and a silane compound represented by general formula (2) shown below are used in combination as compounds to be immobilized on the interlayer surface of the layered inorganic compound via covalent bonds:

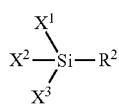

(2)

wherein, $R^2$ represents a $C_{1-25}$ alkyl group, a $C_{2-25}$ alkenyl group, a $C_{5-8}$ cycloalkyl group, or a $C_{6-12}$ aryl group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each represent the same groups as $X^1$ to $X^3$ in the general formula (1).

19. The polymer nanocomposite production method according to claim 3, wherein the radical polymerization initiator having the group represented by the general formula (1) and a silane compound represented by general formula (2) shown below are used in combination as compounds to be immobilized on the interlayer surface of the layered inorganic compound via covalent bonds:

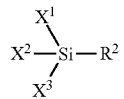

(2)

wherein, $R^2$ represents a $C_{1-25}$ alkyl group, a $C_{2-25}$ alkenyl group, a $C_{5-8}$ cycloalkyl group, or a $C_{6-12}$ aryl group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each represent the same groups as $X^1$ to $X^3$ in the general formula (1).

20. The polymer nanocomposite production method according to claim 4, wherein the radical polymerization initiator having the group represented by the general formula (1) and a silane compound represented by general formula (2) shown below are used in combination as compounds to be immobilized on the interlayer surface of the layered inorganic compound via covalent bonds:

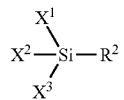

(2)

wherein, $R^2$ represents a $C_{1-25}$ alkyl group, a $C_{2-25}$ alkenyl group, a $C_{5-8}$ cycloalkyl group, or a $C_{6-12}$ aryl group, each of which being optionally substituted by a $C_{1-18}$ alkyl group, a phenyl group, or a cyano group and being optionally interrupted by an oxygen atom, a carbonyl group, an ester group, a phenylene group, an amide group, or an imino group, the substitution and the interruption being optionally combined with each other; and $X^1$ to $X^3$ each represent the same groups as $X^1$ to $X^3$ in the general formula (1).

* * * * *